United States Patent [19]
Yocum

[11] Patent Number: 5,319,718
[45] Date of Patent: Jun. 7, 1994

[54] LOUDSPEAKER CONE AND METHOD FOR MAKING SAME

[76] Inventor: Fred D. Yocum, 2550 NE. 31st Ct., Lighthouse Point, Fla. 33064

[21] Appl. No.: 775,179

[22] Filed: Oct. 11, 1991

[51] Int. Cl.⁵ .............................................. H04R 25/00
[52] U.S. Cl. ..................................... 381/193; 381/202; 381/204
[58] Field of Search ................ 381/188, 193, 202, 204, 381/205; 29/594, 609.1; 181/171, 172

[56] References Cited

U.S. PATENT DOCUMENTS

| | | |
|---|---|---|
| 1,872,583 | 8/1932 | Hawley . |
| 2,302,178 | 11/1942 | Brennan . |
| 2,646,853 | 7/1953 | Pocock . |
| 2,670,807 | 3/1954 | Brown . |
| 2,734,591 | 2/1956 | Olson et al. . |
| 2,840,177 | 6/1958 | Schoengold ......................... 381/172 |
| 3,612,783 | 7/1967 | Schneider ............................ 381/204 |
| 3,684,052 | 8/1972 | Sotome ................................ 381/193 |
| 3,767,004 | 10/1973 | Liebscher ............................ 181/172 |
| 3,850,650 | 11/1974 | Von Bonin et al. ................. 106/602 |
| 3,858,680 | 1/1975 | Tsuge et al. ......................... 381/172 |
| 3,997,023 | 12/1976 | White .................................. 181/172 |
| 4,014,737 | 3/1977 | Brennan .............................. 181/173 |
| 4,646,874 | 3/1987 | Baitcher et al. ..................... 181/172 |
| 4,939,783 | 7/1990 | Dunning .............................. 181/171 |

FOREIGN PATENT DOCUMENTS

| | | |
|---|---|---|
| 1807830 | 6/1970 | Fed. Rep. of Germany ...... 181/171 |
| 0159831 | 4/1983 | German Democratic Rep. ................................... 181/171 |
| 55-95497 | 7/1980 | Japan . |
| 201496 | 11/1983 | Japan ................................. 181/165 |
| 0060300 | 3/1991 | Japan ................................. 381/204 |
| 1260124 | 1/1972 | United Kingdom ............... 381/193 |

*Primary Examiner*—Curtis Kuntz
*Assistant Examiner*—Huyen D. Le
*Attorney, Agent, or Firm*—Jones, Tullar & Cooper

[57] ABSTRACT

A loudspeaker cone assembly having a generally conical cone body and an annular flexible suspension rim. In making the cone assembly, a cone body having an outer free edge is placed within a female mold having an annular channel configured to form the suspension rim with the free outer edge of the cone exposed to the channel. A predetermined quantity of liquid plastic foam is deposited into the channel which is then substantially closed by a male die so as to seal off the cone body adjacent its outer free edge. The foam is then expanded and cured so that the resulting annular rim is integrally impregnated into the free outer edge of the cone body and forms high density closed-cell outer skin surfaces on opposite sides of a low density closed-cell inner core to provide a suspension rim having improved flexibility, strength and durability. A color coating may be applied to selective exposed surface areas of the suspension rim.

22 Claims, 2 Drawing Sheets

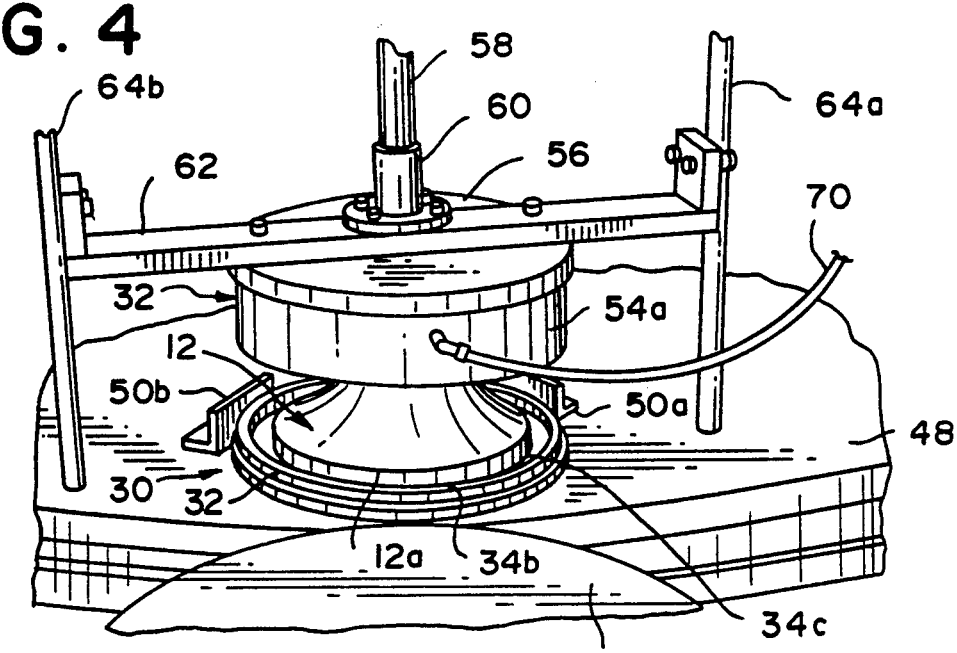
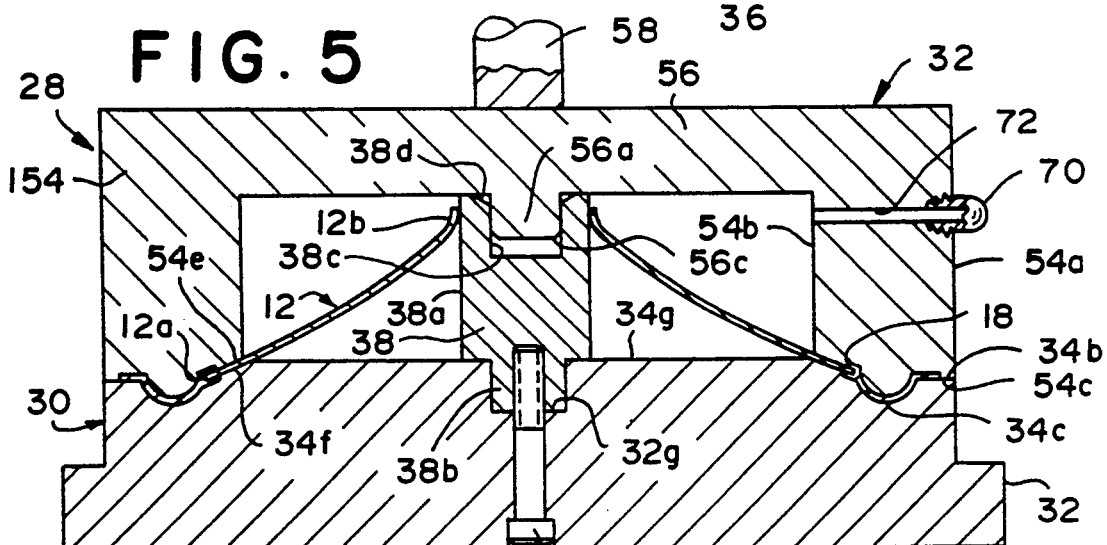
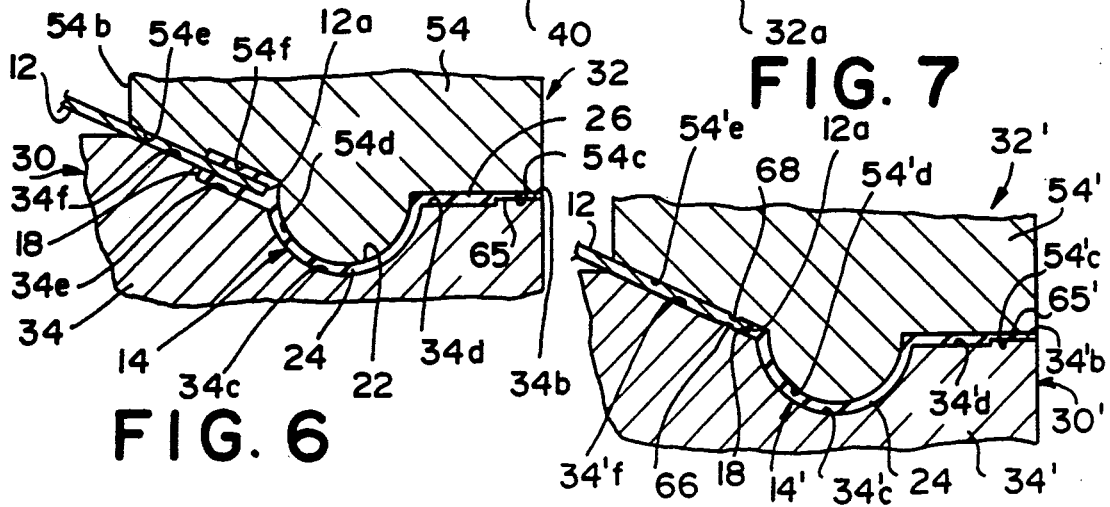

LOUDSPEAKER CONE AND METHOD FOR MAKING SAME

BACKGROUND OF THE INVENTION

The present invention relates generally to loudspeaker cones, and more particularly to a novel loudspeaker cone assembly and method for making same.

Loudspeaker cones, alternatively termed loudspeaker diaphragms, are well known which employ a fibrous or felted paper-type cone or diaphragm adapted to be supported on a support frame through an annular suspension member or rim secured to the outer marginal edge of the cone and having predetermined elastic or flexibility properties. The suspension member or rim may be formed as an integral generally radially directed extension of the periphery of the cone or diaphragm, as disclosed in U.S. Pat. Nos. 1,872,583, 2,302,178 and 4,646,874, or may be formed as a separate annular supporting flange or rim affixed to an outer peripheral edge of the cone, such as disclosed in U.S. Pat. Nos. 2,840,177 and 3,684,052. Alternatively, the loudspeaker cone or diaphragm may be formed of plastic material such as disclosed in U.S. Pat. No. 3,858,680.

With the advent of relatively sophisticated sound reproduction systems, such as in stereophonic sound systems, the dynamic or moving coil-type loudspeaker cones used for the mid and low frequency ranges are subjected to relatively high amplitude vibrations in the axial direction of the cone. In the past, many manufacturers of larger size loudspeaker cones have made the suspension rims from rubber in order to achieve desired flexibility and durability. A drawback to the use of rubber suspension rims is their relative high cost.

To overcome the higher cost of rubber speaker cone suspension rims, attempts have been made to manufacture the suspension rims from plastic foam material. One method for making plastic foam-type suspension rims entails cutting a bulk block of raw foam material into slices or sheets of predetermined thickness. A foam sheet is then placed between heated dies which form an annular rim after which the rim is affixed to the outer edge of a cone, generally by means of an adhesive or sewing. This technique has not been totally successful because the rims generally have insufficient strength integrity to support larger diameter speaker cones. A suspension rim made from a double layer of such foam sheets in a laminated construction by a similar heated die process was found to provide improved suspension rims.

A drawback to all known prior methods or techniques for making loudspeaker cone suspension rims is that they do not facilitate economical manufacture of rims in small lots of different colors, as may be desired for various applications.

Thus, a need exists for a loudspeaker cone assembly having a suspension rim which exhibits desired strength, flexibility and durability and which is economical to manufacture. Further, a relatively low cost suspension rim which has high strength adhesion to the rim of the speaker cone and which can be economically manufactured with various surface colors would find wide acceptance.

SUMMARY OF THE INVENTION

One of the primary objects of the present invention is to provide a novel loudspeaker cone assembly having a cone body and a resilient suspension rim formed of plastic foam material and integrally connected to a peripheral outer edge of the cone body.

A more particular object of the present invention is to provide a novel loudspeaker cone assembly and method of making the cone assembly wherein a plastic foam suspension rim is formed integral with an outer peripheral edge of the cone body by impregnation of the foam rim to the outer edge of the core body.

Another object of the present invention is to provide a novel loudspeaker cone assembly as aforedescribed wherein the suspension rim is formed from a plastic foam in a manner to form high density closed-cell outer skin surfaces on the suspension rim, and wherein the outer skin surfaces form an integral sandwich construction with a low density closed-cell inner core to provide a suspension rim having improved strength, flexibility and durability.

A further object of the present invention is to provide a novel relatively low-cost loudspeaker cone assembly as described, and a method of making the cone assembly wherein a cone body having a outer free edge is placed within a female mold having an annular channel or cavity configured to form the suspension rim with the free edge of the cone exposed to the channel. A predetermined quantity of liquid plastic foam is deposited into the channel which is then substantially closed by a male die so as to seal the cone body adjacent its outer free edge. The foam is then cured under pressure and temperature conditions so that the resulting annular rim is integrally impregnated into the free outer edge of the cone body and forms high density closed-cell outer skin surfaces in an integral sandwich construction with a low density closed-cell inner core, thereby providing improved flexibility, strength and durability. The outer skin surfaces also protect the suspension rim from the adverse effects of ultraviolet radiation and other environmental conditions.

Another object of the present invention lies in the provision of a tool or die assembly for making a speaker cone assembly wherein a female mold and male die are cooperative to receive and seal an outer peripheral edge of the speaker cone body so as to prevent undesired flow of liquid plastic foam onto the cone as the foam fills a cavity in the die assembly and integrally connects to the edge of the cone body exposed within the cavity.

A feature of the loudspeaker cone assembly in accordance with the invention lies in applying a color coating to a selected exposed surface area of the annular suspension rim in a manner enabling economical short run production of different color suspension rims which are integrally affixed to the outer free edges of associated speaker cone bodies during the manufacturing process.

Another feature of the loudspeaker cone assembly in accordance with the invention lies in forming the plastic foam suspension rim so that, in one embodiment, an inner peripheral edge of the rim impregnates opposite surfaces of the cone body adjacent its outer edge, while in another embodiment the inner peripheral edge of the rim forms an integral butt-joint connection to the outer edge of the cone body.

Further objects, features and advantageous of the present invention, together with the organization and manner of opposition thereof, will become apparent from the following detailed description of the invention when taken in conjunction with the accompanying drawings wherein like reference numerals designate like elements throughout the several views.

BRIEF DESCRIPTION OF THE DRAWINGS

FIG. 4 is a perspective view illustrating a further step in forming the suspension rim in integrally connected relation to the speaker cone body in accordance with the present invention;

FIG. 5 is a vertical longitudinal sectional view illustrating the female mold and male die in cooperating relation during forming of a foam suspension rim on the outer edge of a speaker cone body in accordance with the invention;

FIG. 6 is an enlarged fragmentary sectional view illustrating the sealing relation of the female mold and male die with the cone body in accordance with one embodiment of the invention; and FIG. 7 is an enlarged fragmentary detail view similar to FIG. 6 but illustrating an alternative manner of sealing the cone body between the female mold and male die, and with the suspension rim affixed to the outer free edge of the cone body through a butt-joint connection.

DETAILED DESCRIPTION

Figure 1:
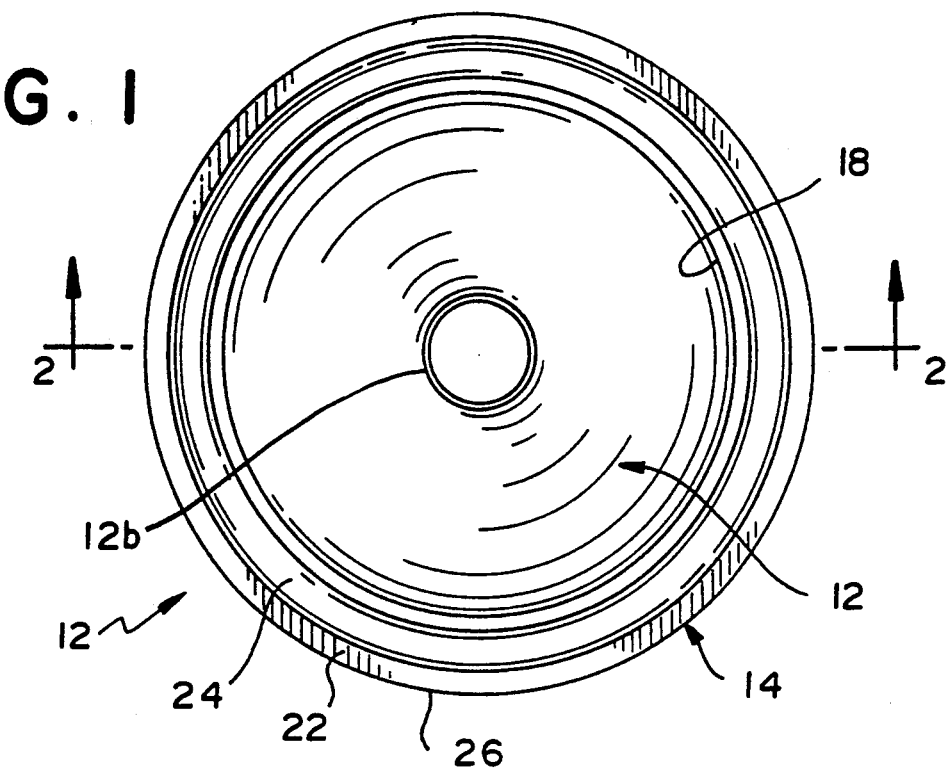
FIG. 1 is a front elevational view of a loudspeaker cone assembly constructed in accordance with the present invention.
Figure 2:
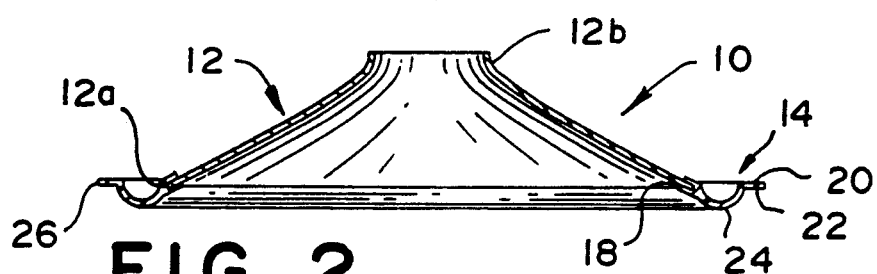
FIG. 2 is a transverse sectional view taken substantially along line 2—2 of FIG. 1.

Referring now to the drawings, and in particular to FIGS. 1 and 2, a loudspeaker cone assembly constructed in accordance with the present invention is indicated generally at 10. The loudspeaker cone assembly 10, which may alternatively be termed a speaker cone or acoustic diaphragm, includes a sound radiating cone body or element 12 and an annular suspension rim 14. The suspension rim 14 is integrally connected to an outer peripheral edge 12a of the cone body 12 and facilitates attachment or mounting of the loudspeaker cone assembly to support means such as the support frame of an acoustic device or speaker cabinet, as is known. In the illustrated embodiment, the cone body 12 has a generally frustoconical configuration having a concave curvilinear annular profile, as illustrated in FIG. 2. The illustrated cone body 12 has a circular outer peripheral edge 12a and an annular generally cylindrical neck portion 12b extending in the axial direction of the cone and to which a voice coil or the like may be attached in a conventional manner. Alternatively, the cone body 12 may have an elliptical or square outer peripheral edge, with the peripheral wall of the cone body being correspondingly modified from a generally conical configuration to accommodate the shape of the selected outer edge.

In the illustrated embodiment, the cone body 12 has a fibrous or felted paper construction which may be formed by a conventional felting process as conventionally employed in the manufacture of paper cones. For example, the cone body or diaphragm 12 may be formed by a feramonous form, such as a screen, having the desired configuration of the finished cone or diaphragm. The feramonous form is submerged in a water suspension of paper fibers and suction is applied to one side of the form so as to draw the suspension therethrough. Felting of the paper fibers occurs on the form opposite the side through which the suction is applied until the desired thickness of fibers are built up on the form to establish a peripheral wall of generally uniform thickness from the free edge of the neck portion 12b to the outer free edge 12a of the cone body. The felted form is then dried sufficiently to enable removal of the fibrous cone body from the feramonous form. Conventionally, the cone body 12 is formed to a thickness in the range of approximately 0.006–0.070 inch. The making of felted or fibrous cone bodies is an old well established art as exemplified by the aforementioned U.S. Pat. No. 1,872,533 which is incorporated herein by reference. Alternatively, the cone body 12 may be made of a suitable plastic material having a configuration substantially identical to the described cone body 12.

In accordance with one feature of the present invention, the annular suspension rim 14 is made from a plastic foam material such that an inner peripheral edge 18 of the suspension rim 14 is integrally affixed to the outer free edge 12a of the cone body 12. As will be described, the plastic foam annular suspension rim 14 is formed in a manner to establish high density closed-cell skin surfaces on both the inner and outer exposed surfaces of the suspension rim, as indicated at 20 and 22, respectively, in FIG. 2. The high density closed-cell skin surfaces 20 and 22 are formed in an integral sandwich construction on opposite sides of a closed-cell cellular inner core having lower density than the high density skin surfaces.

In the illustrated embodiment, the suspension rim 14 is formed so as to define a forwardly extending annular surface 24 which is of generally uniform radius, as considered in transverse cross section in FIG. 2, and is integral with the inner peripheral edge portion 18 and a generally radial outer peripheral flange portion 26 of the suspension rim 14. The forwardly extending annular surface 24 need not have a uniform radius, but may have a curvature which provides a variable rim thickness from its inner peripheral edge 18 to its outer free edge.

The plastic foam material from which the suspension or supporting rim 14 is formed preferably comprises a closed-cell polyurethane foam such as available in liquid state from Plast-O-Meric, Inc., North Baltimore, Ohio, under its product identification No. SSF-1782 Polyurethane System. If desired, one or more filler materials such as microscopic size glass beads, talcum powder or other desired filler, may be added to the liquid plastic foam prior to forming the suspension rim 14.

Briefly, the suspension rim 14 is formed by a low pressure casting process wherein a predetermined volume by weight of the liquid polyurethane foam is deposited into a tool, indicated generally at 28 in FIG. 5, at atmospheric pressure. The liquid foam is preferably deposited in a continuous bead into an open annular cavity in a female mold portion 30 of the tool 28. The female mold 30 supports a cone body 12 with its outer peripheral edge 12a exposed within the annular cavity after which a male die 32 is brought into cooperation with the female mold to establish a substantially closed annular chamber having a configuration identical to the desired configuration of the suspension rim 14. The liquid foam is deposited in sufficient volume to totally fill the annular chamber when expanded and cured. The foam both impregnates the exposed outer peripheral edge 12a of the cone body 12 to form an integral connection therewith, and forms the high density closed-cell outer skin surfaces 20 and 22 in an integral sandwich construction with a lower density cellular inner core. After curing, the suspension rim 14 and associated cone body 12 are removed from the tool 28 in substantially the form of the loudspeaker cone assembly 10. In the following described method of making the suspension rim 14 so that it is integrally connected to the outer edge 12a of the cone body 12, the suspension rim is preferably formed to a thickness in the range of approximately 0.015 to 0.070 inch depending upon the intended application of the loudspeaker cone assembly being manufactured, although other rim thicknesses, or a rim having a variable thickness across its transverse section, may be desirable for some applications.

Figure 3:
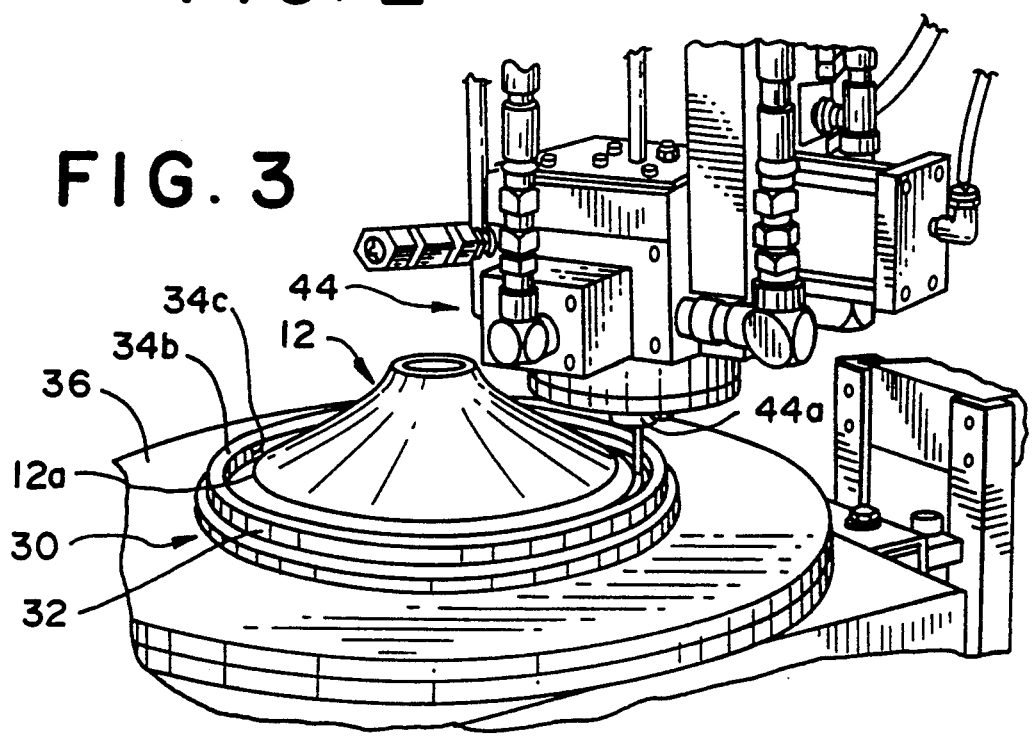
FIG. 3 is a perspective view illustrating the step of depositing a bead of liquid plastic foam into a female mold to form the suspension rim in accordance with the method of the invention.

Referring now to FIGS. 3–6 for a more detailed description of the method for making the loudspeaker cone assembly 10, the female mold 30 is made of a suitable rigid material, such as a suitable metallic or plastic material, and has a base 34 having a flat base surface 34a adapted to be placed on a turntable or the like, such as indicated at 36 in FIG. 3, coaxially with the axis of rotation of the turntable. In the illustrated embodiment, the base 34 is generally circular. However, where the suspension rim 14 is to have a non-circular configuration, such as an elliptical or square plan configuration, the base 34 may have a corresponding outer periphery. The female mold 30 has an upper annular planar surface 34b formed parallel to the lower base 34a. An annular cavity or groove 34c of substantially uniform radius or semi-circular transverse cross section is formed in the planar surface 34b and is radially intersected by an annular surface 34d of a radial width substantially equal to the radial dimension of the annular flange 26 on the suspension rim 14. The inner peripheral boundary of the annular cavity 34c is intersected by an annular conical surface 34e which is concentric with but depressed from a conical surface 34f having a contour substantially equal to the contour of the cone body 12 adjacent its outer free edge 12a. The annular surface 34f intersects an upper planar surface 34g on the female mold and serves as a pilot surface to be engaged by the inner surface of the cone body 12 when placed on the female mold 30 during the manufacturing process. As will be described, the conical surface 34f also cooperates with a similarly configured and mutually opposed conical surface 54e on the male die 32 to secure and seal the outer peripheral edge portion of a cone body during forming of a suspension rim on the outer edge of the cone body.

A cone body locating post 38 is mounted on the base portion 34 of the female mold 30 in coaxial relation therewith. In the illustrated embodiment, the post 38 has a cylindrical outer surface 38a sized to receive the neck portion 12b of a cone body 12 in sliding relation when the cone body is supported on the female mold in coaxial relation engaging the surface 34f and with the free outer edge portion of the cone body extending above and parallel to the recessed conical surface 34e on the female mold. The post 38 has a smaller diameter coaxial cylindrical boss 38b which is snugly received with a cylindrical recess 32g formed coaxially in the base portion 34 and is fixed therein by means of a bolt 40. The small diameter boss 38b allows different diameter posts to be mounted on the female mold to accommodate cone bodies having different diameter neck portions 12b.

With the female mold 30 positioned coaxially on the turntable 36 as illustrated in FIG. 3, a plastic foam mixing and dispensing head 44 having a discharge nozzle 44a is brought into position overlying the female mold such that the discharge nozzle directly overlies the annular channel 34c. The mixing and dispensing head 44 is of known design and has controls associated therewith (not shown) operative to provide a timed discharge of liquid foam from the discharge nozzle correlated to the rotational speed of the turntable 36. The dispensing head 44 may be supported by an articulated support arm (not shown) enabling movement of the dispensing head from a position spaced from the turntable to a position overlying the annular groove or cavity 34c, and vice-versa. If desired, a suitable release agent may be wiped onto the female mold to lightly coat the annular groove 34c and the adjacent recessed surfaces 34d and 34e.

With the dispensing head 44 so positioned, a bead of liquid plastic foam of the aforedescribed type is discharged into the annular groove 34c simultaneously with rotation of the turntable 36 at a predetermined rotational speed in relation to the rate of discharge from the dispensing head. This relationship is established so that a predetermined volume by weight of plastic foam is deposited into the annular groove 34c in a continuous but not overlapping bead. The volume by weight of liquid plastic foam discharged into the annular groove 34c is substantially equal to the volume and weight of foam in the suspension rim 14 on the completed loudspeaker cone assembly 10. Conversely, the female mold 30 may be supported on a stationary support and the dispensing head 44 moved through a path overlying the annular groove or cavity 34c to effect discharge of a bead of foam about the full periphery of the groove or cavity.

After depositing a bead of liquid plastic foam into the annular groove 34c, rotation of the turntable 36 is terminated and the dispensing head 44 is moved away from the turntable. The female mold 30 is then transferred to a curing work station. In the illustrated embodiment, the curing station includes a horizontal support surface 48 which is preferably closely adjacent and substantially coplanar with the upper support surface on the turntable 36. The support surface 48 may comprise a portion of a substantially larger rotatable turntable which defines a plurality of work stations about its periphery at substantially equal circumferentially spaced positions on the surface 48. A pair of upstanding locating or stop brackets 50a and 50b serve to abut and locate the female mold 30 at the curing work station when moved onto the support surface 48.

The male die 32 has an annular wall 54 defined between coaxial outer and inner cylindrical surfaces 54a and 54b, respectively. The outer surface 54a has a diameter substantially equal to outer diameter of the base portion 34 of the female mold 30 adjacent the annular surface 34b. The annular wall 54 is formed integral with and depends from a circular plate 56 which is fixed at its center to the lower end of a vertically reciprocable piston rod 58. The piston rod 58 extends axially from a vertically disposed double acting pneumatic or hydraulic cylinder (not shown) and is guided through a guide bushing 60 supported on a bracket 62 between a pair of support posts 64a and 64b. The male die 32 is vertically movable through selective actuation of the double acting cylinder from a position spaced above the female mold 30, as illustrated in FIG. 4, to an operating position wherein an annular planar surface 54c on the annular wall 54 engages or bottoms against the annular surface 34b on the female mold 30. Preferably, vent means in the form of one or more radial grooves, one of which is indicated at 65 in FIG. 6, are formed in the annular surface 34b on the female mold to accommodate expansion of the foam deposited into the cavity 34c. The venting grooves 65 thus serve as a pressure relief or expansion path for the liquid plastic foam during expansion and curing as will be described.

A pilot boss 56a is formed coaxially on the underside of the circular plate 56 for sliding entry into a cylindrical recess 38c formed coaxially in the cone locating post 38. Preferably an annular chamfer surface 38d is formed on the post 38 concentric with the cylindrical recess 38c. An annular chamfer 56c is also formed at the lower end of the pilot boss 56a to facilitate entry into the recess 38c.

The annular wall 54 of the male die 32 also has an annular convex surface 54d and an annular frustoconical surface 54e formed on its lower end which are configured to lie in predetermined parallel spaced relation to the concave cavity surface 34c and conical surfaces 34e and 34f on the female mold 30 when the male die is in its lowered operating position relative to the female mold, as shown in FIG. 6. The annular surface 54e on the male die 32 is spaced above the annular inclined or conical surface 34f by a distance slightly less than the nominal wall thickness of the cone body 12 so that the mutually opposed surfaces 34f and 54e engage the cone body and maintain it firmly in position between the male die and female mold when the male die is lowered to its operating position relative to the female mold. The mutually opposed surfaces 34f and 54e effect a sealing relation with the interposed wall of the cone body 12 to prevent blow-by or the passage of liquid plastic foam from the suspension rim cavity established between recessed surface 34e and the mutually opposed annular recessed surface 54f on the lower end of the male die.

The annular convex surface 54d on the male die 32 is substantially semi-circular in transverse cross-section so that when the male die is lowered into operating position with the lower female mold 30, a substantially closed chamber is established having a transverse cross-sectional profile and volume substantially equal to the desired cross-sectional configuration of the suspension rim 14 on the loudspeaker cone assembly 10. With a cone body 12 mounted on the female mold over the post 38, the free outer peripheral edge 12a of the cone extends a predetermined distance, such as approximately 0.0625-0.125 inch, into the cavity established between the mutually opposed surfaces 34e and 54f. In similar fashion to the female mold 30 and its annular cavity or groove 34c, the male die 32 may be modified so that the wall 54, and its planar surface 54c, have a configuration corresponding to the shape selected for the female mold which, in turn, is dependent on the configuration of the cone body 12 and corresponding suspension rim selected. Similarly, the transverse curvature of the annular convex surface 54d on the male die 32 may be configured so that it is not parallel to the cavity surface 34c on the female mold, thereby providing a variable thickness rim as desired.

Lowering the male die 54 into operating position with the female mold 30 causes the deposited bead of liquid plastic foam to substantially fill the closed suspension rim chamber and simultaneously embed the exposed peripheral edge 12a of the cone body 12 exposed between surfaces 34e and 54f. During expansion and curing, the liquid plastic foam impregnates the exposed inner and outer surfaces of the cone body adjacent its outer free edge 12a. As previously described, as the plastic foam expands, it forms high density closed-cell outer skin surfaces on the suspension rim 14 in an integral sandwich construction with an interposed lower density cellular core. The high density closed-cell skin surfaces protect the suspension rim 14 from the adverse effects of environmental conditions, such as ultraviolet rays which can lead to premature deterioration as experienced with prior foam speaker cone suspension rims.

FIG. 7 illustrates an alternative, and often preferred, embodiment of the manner of attaching an annular suspension rim, indicated at 14', to the outer peripheral edge 12a of a cone body 12 in a butt-joint connection. In the embodiment of FIG. 7, structural elements similar to the elements illustrated in FIG. 6 are represented by corresponding primed reference numerals. The annular recessed surface 34e on the female mold 30 and the annular recessed surface 54f on the male die 32 are eliminated in the embodiment of FIG. 7. Thus the lower end surface on the annular wall 54' of the male die 32' has an annular or conical surface 54'e which intersects the inner margin of the convex surface 54'd. Similarly, the annular or conical surface 34'f on the female mold intersects the inner marginal edge of the concave cavity surface 34'c. A pair of mutually opposed annular pinch beads 66 and 68 are formed, respectively, on the annular conical surface 34'f on the female mold 30' and on the opposed surface 54'e of the male die 32' so as to pinch the cone body 12 between the pinch beads closely adjacent the outer peripheral edge 12a of the cone body. The pinch beads 66 and 68 are sized to pinch and seal the cone body 12 so as to prevent flow of liquid foam upwardly onto the cone wall but without crushing or damaging the cone wall. In other respects, the interfacing surfaces of the female mold 30' and the male die 32' are substantially identical to the embodiment illustrated in FIG. 6. Similarly, the manner of depositing a bead of liquid plastic foam within the annular channel 34'c in the female mold 30' and bringing the male die and female mold into cooperating relation so as to fill the resulting substantially closed cavity with liquid plastic foam and with the annular surfaces 34'b and 54'c on the female mold 30' and male die 32' in abutting relation is the same as described in respect to FIG. 6. During expansion, the liquid foam impregnates the edge 12a of the cone body in a butt-joint connection. Excess expansion of the plastic foam is accommodated by one or more relief or escape vent grooves 65'.

As an alternative to the pinch beads 66 and 68, a pair of mutually opposed annular grooves could be formed in the opposed surfaces 34'f and 54'e on the female mold 30' and male die 32', respectively. The annular grooves would receive O-ring type resilient seals for sealing relation with the cone body. Annular spring biased compression rings, could also be used to seal the outer cone edge so as to prevent foam from contacting the cone body upwardly from the annular seal means. The latter alternative cone sealing means, namely, resilient O-rings and spring biased compression rings are particularly desirable where the tool 28 is used to make different thickness suspension rims, and/or is used with different thickness cone bodies. When it is desired to increased the thickness of the suspension rim 14, annular shims may be mounted between the abutting stop surfaces 34b and 54c on the female mold and male die.

Returning again to FIG. 5, the upper die 32 is moved into its operating position with the female mold 30 in a manner to prevent separation or lifting of the male die 54 from the female mold during expansion and curing of the liquid plastic foam. This may be accomplished by pressurizing the associated double acting cylinder to prevent upward movement of the male die during the foam expansion and curing cycle. Alternatively, the male die 32 may be maintained in fixed relation with the female mold 30 by toggle linkages or the like which may be manually or automatically actuated to prevent upward movement of the male die until intended release of the applied retaining force. It has been found that when a quantity of liquid plastic foam sufficient to form the suspension rim 14 is deposited within the annular cavity 34c in the female mold 30 and caused to expand with the male die 32 positioned to establish a substantially closed chamber with the annular cavity, a reactive pressure is created within the chamber. This pressure is resisted by applying sufficient pressure to the double acting cylinder which actuates the piston 58, or by selective use of toggle linkage type clamps acting on the male die 32.

With the male die 32 in operative relation with the female mold 30, and with liquid plastic foam deposited within the rim cavity 34c as described, the closed tool 28 is heated to approximately 120° F. so that the liquid foam within the annular cavity is subjected to approximately 120° F. during expansion and curing of the foam. Heating of the female mold 30 and male die 32 of the tool may be carried out by any suitable heating means. In a preferred embodiment, the closed tool 28 is moved into a heating oven which may be formed to extend partially about the turntable 48 so that indexing the turntable causes the closed mold to be disposed within the heating oven for a predetermined period of time.

In accordance with another feature of the invention, a color coating may be applied to selected exposed surface areas on the annular suspension rim 14. If color coating is desired, such as on the forward exposed surface 22 of the rim 14, a release agent, such as commercially available from Moline Paint Manufacturing Co., Moline, Ill., under its product identification No. MPM 11-X153A, is applied to the surfaces 34c-e prior to depositing the liquid foam into the annular cavity 34c in the female mold. A selected urethane color coating, such as a urethane color coating available from Moline Paint Manufacturing Co. under its ALIPHLEX ® System, is then applied as by spraying onto the mold surfaces 34c-e. If desired, a color coating having a release agent mixed therein may be used, thereby eliminating application to the female mold of a separate release agent. Also, fillers such as microscopic size glass beads, talcum powder or additives giving the coating a pearlescent finish could be added to the color coating applied to the mold surfaces 34c-e.

Preferably a shield, such as a paper shield having the shape of the cone body 12, is placed over the cone guide post 38 to mask off and shield the surfaces 34g and 34f from the color coating spray. Alternatively, the color coating may be sprayed onto the female mold surface 34c-e by an electrostatic process so that no shield is needed. During curing of the liquid foam within the closed cavity between the female mold and male die, the color coating, as selectively applied to the female mold, is transferred to and adheres to the corresponding outer exposed surface areas of the suspension rim 14. After curing of the liquid foam, the male die 32 is raised from the female mold and the resulting finished loudspeaker cone assembly is removed. It will be appreciated that selected surface areas on the inner surface 20 of the suspension rim may be provided with a color coating in a similar manner. In addition to providing a desired aesthetic appearance, the color coating further enhances the resistance of the suspension rim to adverse environmental conditions.

If desired, an air pressure conduit, such as indicated at 70 in FIG. 4, may be secured at one end to the outer surface 54a of the male die so as to communicate with the open space above a cone body 12 supported between the female mold 30 and male die 32' as through an air passage 72 formed in the annular wall 54. The opposite end of the pressure conduit 70 is connected through a control valve (not shown) to a suitable air pressure source. Air pressure may be manually or automatically introduced into the annular chamber above the cone body 12 when the male die is raised from the female mold to assist in release of the speaker cone assembly from the male die.

Thus, in accordance with the present invention, a loudspeaker cone assembly is provided which includes a flexible suspension or supporting rim 14 having high density closed-cell skin surfaces disposed on opposite sides of a lower density closed-cell internal core in an integral sandwich construction. The thus formed suspension rim is impregnated into and integrally connected to the outer circumferential edge 12a of the cone body 12 either in overlapping relation on both sides of the peripheral edge of the cone body such that the outer edge of the cone is embedded within the suspension rim, as illustrated in FIG. 6, or by a butt-joint connection, as illustrated in FIG. 7. Further, a selected color coating may be economically applied to selected exposed surface areas of the flexible mounting rim. For example, when the speaker cone is to be mounted within a loudspeaker support frame with the suspension rim visible to the user, color coating of the outer surface 22 of the suspension rim may be desirable to provide a particular color scheme. The integral sandwich construction of the suspension rim 14 greatly improves the strength, flexibility and durability of the suspension rim over prior foam loudspeaker suspension rims.

While preferred embodiments of the loudspeaker cone assembly in accordance with the present invention, and a preferred method of manufacture, have been illustrated and described, it will be understood that changes and modifications may be made therein without departing from the invention in its broader aspects. Various features of the invention are defined in the following claims.

What is claimed is:

1. A loudspeaker cone assembly comprising, in combination, a generally frustoconical cone body having a fibrous outer circumferential edge, and a flexible annular rim having an inner peripheral edge impregnated into the fibrous outer circumferential edge of said cone body in an interstitial connection thereto and having an outer free peripheral edge enabling mounting of the cone assembly to support means, wherein said interstitial connection with said cone body is solely at said rim inner peripheral edge, said rim being made of a plastic foam material having high density closed-cell outer skin surfaces.

2. A loudspeaker cone assembly as defined in claim 1 wherein said cone body is made of a fibrous material.

3. A loudspeaker cone assembly as defined in claim 1 wherein said cone body has inner and outer conical surfaces terminating at said outer circumferential edge of the cone body, said inner peripheral edge of said rim being in overlapping impregnated relation to said inner and outer conical surfaces adjacent said outer circumferential edge of said cone body.

4. A loudspeaker cone assembly as defined in claim 3 wherein said inner peripheral edge of said rim overlaps said inner and outer conical surfaces of said circumferential edge a distance equal to approximately the thickness of said rim at its outer free edge.

5. A loudspeaker cone assembly as defined in claim 1 wherein said rim is made from a closed-cell flexible polyurethane foam.

6. A loudspeaker cone assembly as defined in claim 5 wherein said polyurethane foam includes a filler material.

7. A loudspeaker cone assembly as defined in claim 6 wherein said filler material is selected from a group consisting of small size glass beads and talcum powder.

8. A loudspeaker cone assembly as defined in claim 1 wherein said rim has a closed-cell center core bounded by said high density closed-cell skin surfaces, said closed-cell center core having a lower density than said skin surfaces.

9. A loudspeaker cone assembly as defined in claim 1 wherein said inner peripheral edge of said rim forms a butt-joint connection with said outer circumferential edge of said cone body.

10. A loudspeaker cone assembly as defined in claim 1 including a color coating formed on selected areas of said high density closed-cell skin surfaces.

11. A loudspeaker cone assembly as defined in claim 1 wherein said cone body has a transverse thickness in the range of approximately 0.006–0.070 inch, and said rim has a thickness in the range of approximately 0.015–0.070 inch.

12. A loudspeaker cone assembly as defined in claim 1 wherein said rim is made by a low pressure casting process including the steps of depositing a predetermined quantity of liquid polyurethane foam into an open annular channel so as to foam a bead of form in said channel, positioning the cone body so that its fibrous outer circumferential edge is exposed to said channel, closing said channel to create a substantially closed annular chamber having a configuration substantially identical to the desired annular configuration of said rim, and causing said foam to expand and cure in a manner to impregnate said exposed edge of said circumferential edge and form said high density closed-cell skin surfaces.

13. A loudspeaker cone assembly as defined in claim 12 wherein said foam is cured at a predetermined temperature above atmospheric temperature.

14. A loudspeaker cone assembly as defined in claim 13 wherein said foam is cured at a temperature of approximately 120° F.

15. A loudspeaker cone assembly as defined in claim 12 wherein the cone has inner and outer conical surfaces terminating at the outer circumferential edge of the cone body, said fibrous outer circumferential edge of said cone body being exposed within said channel so that said foam expands to overlap and impregnate the inner and outer conical surfaces of the fibrous circumferential edge therefor.

16. The loudspeaker cone assembly as defined in claim 12 including the step of selectively applying a color coating to the exposed surface of said annular cavity prior to depositing said bead of plastic foam into said cavity, said coating being of the type adapted to transfer to the adjacent surface of the foam rim during forming of said rim.

17. The loudspeaker cone assembly as defined in claim 12 wherein said liquid plastic foam is deposited into said cavity in a quantity sufficient to establish an expansion pressure within the chamber during expansion of the foam.

18. A loudspeaker cone assembly as defined in claim 1 wherein said annular rim is of substantially uniform thickness.

19. A loudspeaker cone assembly as defined in claim 1 wherein said inner peripheral edge of said annular rim is defined by a generally frustoconical annular wall.

20. A loudspeaker cone assembly as defined in claim 19 wherein said outer peripheral edge of said annular rim is defined by a generally planar annular wall, said annular rim defining a generally arcuate annular wall intermediate said inner and outer peripheral edges.

21. A loudspeaker drive assembly, comprising:
a driver body having a fibrous outer circumferential edge;
a flexible annular rim having an inner peripheral edge impregnated into the fibrous outer circumferential edge of said drive body in an interstitial connection thereto and having an outer peripheral edge enabling mounting of the driver assembly to support means, wherein said interstitial connection with said driver body is solely at said rim inner peripheral edge;
said rim being made of a plastic foam material having high density closed-cell outer skin surfaces;
said rim having a closed-cell center core bounded by said high density closed-cell skin surfaces, said closed-cell center core having a lower density than said skin surfaces.

22. The loudspeaker driver assembly as defined in claim 21, wherein said rim is made from a closed-cell flexible polyurethane foam.

* * * * *

UNITED STATES PATENT AND TRADEMARK OFFICE
CERTIFICATE OF CORRECTION

PATENT NO. : 5,319,718
DATED : June 7, 1994
INVENTOR(S) : Fred D. Yocum

It is certified that error appears in the above-indentified patent and that said Letters Patent is hereby corrected as shown below:

Column 12, Claim 21, line 1, change "drive" to --driver--;

line 6, change "drive" to --driver--.

Signed and Sealed this

Thirtieth Day of August, 1994

Attest:

BRUCE LEHMAN

*Attesting Officer*  *Commissioner of Patents and Trademarks*